(12) United States Patent
Liu et al.

(10) Patent No.: US 11,735,978 B2
(45) Date of Patent: Aug. 22, 2023

(54) FREE PISTON GENERATOR BASED ON RIGID SYNCHRONOUS TRANSMISSION SYSTEM

(71) Applicant: Harbin Engineering University, Harbin (CN)

(72) Inventors: Long Liu, Harbin (CN); Qihao Mei, Harbin (CN); Hao Zhao, Harbin (CN); Zhichun Xu, Harbin (CN); Yuanheng Tang, Harbin (CN); Chen An, Harbin (CN); Xiao Han, Harbin (CN); Junjie Liu, Harbin (CN)

(73) Assignee: HARBIN ENGINEERING UNIVERSITY, Harbin (CN)

( * ) Notice: Subject to any disclaimer, the term of this patent is extended or adjusted under 35 U.S.C. 154(b) by 0 days.

(21) Appl. No.: 17/564,656

(22) Filed: Dec. 29, 2021

(65) Prior Publication Data

US 2022/0123627 A1    Apr. 21, 2022

(30) Foreign Application Priority Data

Mar. 12, 2021    (CN) .......................... 202110272283.5

(51) Int. Cl.
*H02K 7/18*    (2006.01)
*H02K 5/04*    (2006.01)
(Continued)

(52) U.S. Cl.
CPC ............ *H02K 7/1869* (2013.01); *F01B 7/02* (2013.01); *F02B 71/00* (2013.01); *H02K 5/04* (2013.01);
(Continued)

(58) Field of Classification Search
CPC .......... H02K 7/1869; H02K 5/04; H02K 7/10; H02K 7/1166; H02K 7/1884; F01B 7/02; F02B 71/00
See application file for complete search history.

(56) References Cited

U.S. PATENT DOCUMENTS 3,552,120 A * 1/1971 Beale ..................... F02G 1/0435
60/525
RE30,176 E * 12/1979 Beale ..................... F02G 1/0435
60/520
(Continued)

FOREIGN PATENT DOCUMENTS

| WO | WO-03078809 A2 * | 9/2003 | ................ F02B 1/12 |
| WO | WO-03078810 A1 * | 9/2003 | ................ F02B 1/12 |
| WO | WO-03078835 A1 * | 9/2003 | ................ F02B 1/12 |

*Primary Examiner* — Pedro J Cuevas
(74) *Attorney, Agent, or Firm* — IPro, PLLC; Na Xu

(57) ABSTRACT

A free piston generator based on a rigid synchronous transmission system is provided, which belongs to the technical field of power energy. The present disclosure solves the problems of low power generation efficiency and low stability of the existing free piston generator. The free piston generator based on the rigid synchronous transmission system includes a first linear generator set, a second linear generator set, a rigid synchronous transmission assembly, two high-pressure cylinders arranged at two ends of the first linear generator set, and two low-pressure cylinders arranged at two ends of the second linear generator set. The combustion product is firstly subjected to first-stage expansion in the high-pressure cylinder and is then subjected to second-stage expansion in the low-pressure cylinder, which effectively increases the energy utilization in exhaust gas, also increases the expansion work, and further improves the thermal efficiency and the power generation efficiency of the free piston generator. By means of the rigid synchronous transmission assembly, high-pressure pistons and low-pres-
(Continued)

sure pistons are always kept in stable phase operation, so as to avoid the problems of wall-impingement and insufficient pressure of compressed air due to the phase mismatching.

7 Claims, 1 Drawing Sheet

(51) Int. Cl.
    *H02K 7/10*     (2006.01)
    *H02K 7/116*     (2006.01)
    *F02B 71/00*     (2006.01)
    *F01B 7/02*     (2006.01)

(52) U.S. Cl.
    CPC ............. *H02K 7/10* (2013.01); *H02K 7/1166* (2013.01); *H02K 7/1884* (2013.01)

(56) References Cited

U.S. PATENT DOCUMENTS

| | | | | |
|---|---|---|---|---|
| 4,485,768 A * | 12/1984 | Heniges | ................ | F02B 75/04 123/197.1 |
| 4,532,431 A * | 7/1985 | Iliev | ................ | H02K 35/04 290/40 R |
| 4,924,956 A * | 5/1990 | Deng | ................ | F02B 75/04 180/65.245 |
| 5,775,273 A * | 7/1998 | Beale | ................ | F02B 71/04 123/46 B |
| 5,850,111 A * | 12/1998 | Haaland | ................ | H02K 44/24 310/15 |
| 6,170,442 B1 * | 1/2001 | Beale | ................ | F02B 71/04 123/46 B |
| 6,541,875 B1 * | 4/2003 | Berlinger | ................ | H02K 7/1884 290/1 R |
| 6,948,459 B1 * | 9/2005 | Laumen | ................ | F02B 71/04 123/46 R |
| 7,207,299 B2 * | 4/2007 | Hofbauer | ................ | F02B 63/06 123/46 E |
| 7,255,070 B2 * | 8/2007 | Hofbauer | ................ | F02B 71/04 417/364 |
| 7,318,506 B1 * | 1/2008 | Meic | ................ | F02B 75/048 123/46 R |
| 7,383,796 B2 * | 6/2008 | Hofbauer | ................ | F02B 63/06 417/364 |
| 10,472,995 B2 * | 11/2019 | Gusev | ................ | F01B 25/00 |
| 11,404,937 B2 * | 8/2022 | Svrcek | ................ | F02B 71/04 |
| 11,421,586 B2 * | 8/2022 | Liu | ................ | F02B 41/06 |
| 2005/0103287 A1 * | 5/2005 | Hofbauer | ................ | F04B 17/05 123/46 E |
| 2006/0201456 A1 * | 9/2006 | Hofbauer | ................ | F02B 71/04 123/46 R |
| 2006/0213466 A1 * | 9/2006 | Hofbauer | ................ | F02B 1/12 123/46 R |
| 2011/0100002 A1 * | 5/2011 | Muir | ................ | F24T 10/20 60/641.2 |
| 2011/0221206 A1 * | 9/2011 | Milinkovic | ................ | F01K 13/00 60/660 |
| 2018/0179918 A1 * | 6/2018 | Gusev | ................ | F01K 23/10 |
| 2020/0195093 A1 * | 6/2020 | Svrcek | ................ | F02B 71/04 |
| 2022/0120214 A1 * | 4/2022 | Liu | ................ | F02B 41/06 |
| 2022/0123626 A1 * | 4/2022 | Liu | ................ | F02B 71/00 |
| 2022/0399784 A1 * | 12/2022 | Svrcek | ................ | F02B 71/04 |

* cited by examiner

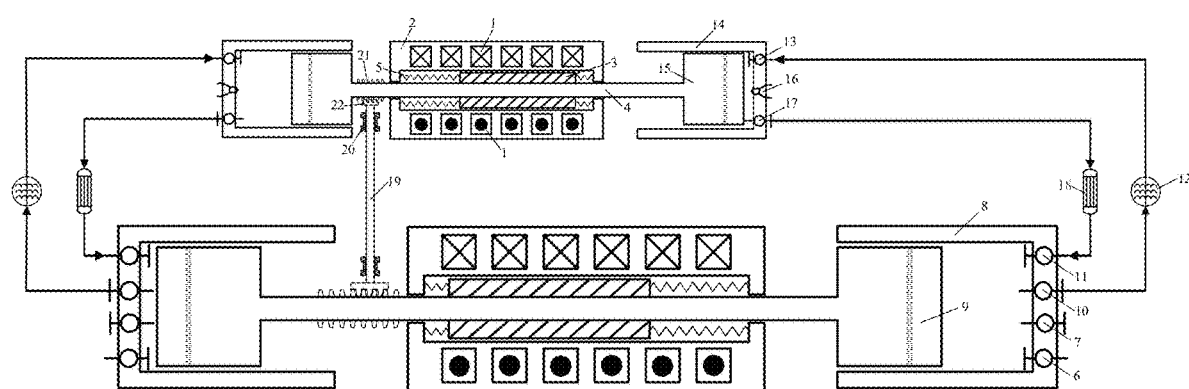

FREE PISTON GENERATOR BASED ON RIGID SYNCHRONOUS TRANSMISSION SYSTEM

TECHNICAL FIELD

The present disclosure relates to a free piston generator based on a rigid synchronous transmission system, and belongs to the technical field of power energy.

BACKGROUND

With the continuous development of society, people's demand for energy is increasing, and the energy problem has become the main issue restricting the further development of all walks of life. In various forms of energy, electrical energy is one of the most widely used energy sources, and electrical energy is mainly provided by diesel engines in industries such as vehicles and ships. In a traditional power generation process of the diesel engine, the form of energy transfer is that: first, the chemical energy of a fuel is converted into mechanical energy output by a crankshaft through combustion of the diesel engine, and then this part of mechanical energy drives a motor to generate power and convert the power into electrical energy. The entire energy conversion process has gone through a lot of steps. At the same time, a lot of energy will be lost due to a complex mechanical structure of the diesel engine, so the overall power generation efficiency is low. In a free piston generator, the work characteristics of the free piston internal combustion engine and a linear motor are coupled, so that the chemical energy of the fuel can be directly converted into electrical energy. Compared with the power generation process of traditional internal combustion engine with crank connecting rod, this process has higher power generation efficiency and superior economic performance, so that it attracts more and more attentions.

For the ordinary free piston generator, a crank connecting rod structure is omitted, so that the mechanical friction between a piston and the cylinder liner is reduced, and the mechanical efficiency is improved. Since its in-cylinder structure is not changed too much compared to that of the ordinary internal combustion engine, with the same in-cylinder work cycle too, so the thermal efficiency of the overall combustion is not improved at all. Due to the restriction on thermal efficiency from the traditional work cycle of the engine, the further optimization to the power generation efficiency of the free piston generator is also restricted.

The optimization to the power generation efficiency of the free piston generator depends on a stable movement state of the piston. In a traditional multi-cylinder internal combustion engine, due to the limiting effect of the crank connecting rod structure and the crankshaft, different cylinders can maintain a fixed phase difference for stable operation. The pistons in different cylinders at all times always appear in the relative spatial positions required by the design, thus ensuring stable performance of the internal combustion engine. For a free piston generator that omits the crank connecting rod and the crankshaft, the movement of the piston in the cylinder can only rely solely on the push effect of fresh air and combustion exhaust gas, but the in-cylinder movement of airflow in each work cycle is extremely unstable under variable working conditions. On the one hand, the piston does not have enough power to compress the in-cylinder fresh air to an ideal state, which leads to the incomplete combustion of fuel spray during the expansion stroke, resulting in a reduction in the power generation efficiency of the free piston generator and an increase in fuel consumption and pollutant emission simultaneously. On the other hand, when there is a strong airflow in the cylinder, the piston moves very fast. Due to the lack of the limiting effect of the crank connecting rod and the crankshaft, the piston is extremely potential to cross the top dead center or the bottom dead center to induce the problem of wall-impingement, which affects the safety of structural components of the cylinder. In addition, due to the in-cylinder unstable airflow movement of the free piston generator, the working condition in each cycle is also unstable, and the superposition of multiple abnormal work cycles will eventually cause the free piston generator to fail in working effectively. Therefore, it is of great importance to take effective measures to maintain the stability of the in-cylinder piston's movement phase for free piston generator.

SUMMARY

In order to solve the problems of low power generation efficiency and low stability of an existing free piston generator, the present disclosure provides a free piston generator based on a rigid synchronous transmission system.

In order to solve the above-mentioned technical problems, the technical solutions adopted in the present disclosure are as follows.

A free piston generator based on a rigid synchronous transmission system includes a first linear generator set, a second linear generator set, a rigid synchronous transmission assembly, two high-pressure cylinders arranged at two ends of the first linear generator set, and two low-pressure cylinders arranged at two ends of the second linear generator set.

The first linear generator set includes a shell, a rotor mandrel movably arranged on the shell in a penetrating manner, a stator coil fixedly arranged in the shell and coaxially sleeving the outside of the rotor mandrel, and a generator rotor coaxially fixedly arranged on the active cell mandrel and located between the stator coil and the rotor mandrel; the structural composition of the second linear generator set is the same as that of the first linear generator set; the two rotor mandrels are connected through the rigid synchronous transmission assembly;

Each high-pressure cylinder includes a high-pressure cylinder block and a high-pressure piston; a closed end of the high-pressure cylinder block is provided with an fuel injector, a high-pressure inlet valve, and a high-pressure exhaust valve; the two high-pressure pistons are fixedly connected to two ends of the rotor mandrel of the first linear generator set, respectively; each low-pressure cylinder includes a low-pressure cylinder block and a low-pressure piston; a closed end of the low-pressure cylinder block is provided with a low-pressure inlet valve, a low-pressure exhaust valve, an inlet port, and an outlet valve; the two low-pressure pistons are fixedly connected to two ends of the rotor mandrel of the second linear generator set, respectively; an intercooler is connected and arranged between the high-pressure inlet valve on the high-pressure cylinder and the outlet valve on the low-pressure cylinder located on the same side as the high-pressure cylinder; and a cross-over channel is connected and arranged between the high-pressure exhaust valve on the high-pressure cylinder and the inlet port on the low-pressure cylinder located on the same side as the high-pressure cylinder.

Further, the rigid synchronous transmission assembly includes a transmission shaft and two worm wheels fixedly arranged at two ends of the transmission shaft; several spiral teeth are circumferentially machined at end parts of the two rotor mandrels close to the transmission shaft; and the two worm wheels and the spiral teeth on the two rotor mandrels are correspondingly engaged to form two groups of worm wheel and worm pairs.

Further, the transmission shaft is mounted on a supporting structure through a bearing.

Further, in each linear generator set, springs are fixedly arranged between two ends of the generator rotor and the shell, respectively.

Further, the number of the high-pressure inlet valves mounted on each high-pressure cylinder block is two.

Further, the stroke of the low-pressure cylinder is the same as that of the high-pressure cylinder.

Further, the volume and the inner diameter of the high-pressure cylinder block are less than the volume and the inner diameter of the low-pressure cylinder block.

Further, piston rings are mounted on the high-pressure piston and the low-pressure piston.

Further, the high-pressure cylinder block and the low-pressure cylinder block are provided with cylinder heads, and a temperature sensor and a pressure sensor are arranged on each cylinder head.

Compared with the prior art, the present disclosure has the following effects.

Air is firstly subjected to first-stage compression by the low-pressure cylinder group in an internal combustion engine set and is then subjected to second-stage compression in the high-pressure cylinders, so that the intake pressure of an internal combustion engine is effectively increased, which is favorable for increasing the average effective pressure, thereby improving the thermal efficiency and the power generation efficiency of the free piston generator.

The combustion product is firstly subjected to first-stage expansion in the high-pressure cylinder and is then subjected to second-stage expansion in the low-pressure cylinder, which effectively increases the energy utilization in exhaust gas, also increases the expansion work, and further improves the thermal efficiency and the power generation efficiency of the free piston generator.

By means of the rigid synchronous transmission assembly, the high-pressure piston and the low-pressure piston are always kept in stable phase operation, so as to avoid the problems of wall-impingement and insufficient pressure of compressed air due to the phase mismatching.

BRIEF DESCRIPTION OF FIGURES

FIG. 1 is a schematic diagram of a front view of the application.

DETAILED DESCRIPTION

Specific implementation mode I: This implementation mode is described in combination with FIG. 1. A free piston generator based on a rigid synchronous transmission system includes a first linear generator set, a second linear generator set, a rigid synchronous transmission assembly, two high-pressure cylinders arranged at two ends of the first linear generator set, and two low-pressure cylinders arranged at two ends of the second linear generator set.

The first linear generator set includes a shell 2, a rotor mandrel 4 movably arranged on the shell 2 in a penetrating manner, a stator coil 1 fixedly arranged in the shell 2 and coaxially sleeving the outside of the rotor mandrel 4, and a generator rotor 3 coaxially fixedly arranged on the rotor mandrel 4 and located between the stator coil 1 and the rotor mandrel 4; the structural composition of the second linear generator set is the same as that of the first linear generator set; the two rotor mandrels 4 are connected through the rigid synchronous transmission assembly;

Each high-pressure cylinder includes a high-pressure cylinder block 14 and a high-pressure piston 15; a closed end of the high-pressure cylinder block 14 is provided with an fuel injector 16, a high-pressure inlet valve 13, and a high-pressure exhaust valve 17; the two high-pressure pistons 15 are fixedly connected to two ends of the rotor mandrel 4 of the first linear generator set, respectively; each low-pressure cylinder includes a low-pressure cylinder block 8 and a low-pressure piston 9; a closed end of the low-pressure cylinder block 8 is provided with a low-pressure inlet valve 6, a low-pressure exhaust valve 7, an inlet port 11 and an outlet valve 10; the two low-pressure pistons 9 are fixedly connected to two ends of the rotor mandrel 4 of the second linear generator set, respectively; an intercooler 12 is connected and arranged between the high-pressure inlet valve 13 on the high-pressure cylinder and the outlet valve 10 on the low-pressure cylinder located on the same side as the high-pressure cylinder; and a cross-over channel 18 is connected and arranged between the high-pressure exhaust valve 17 on the high-pressure cylinder and the inlet port 11 on the low-pressure cylinder located on the same side as the high-pressure cylinder.

The structural composition of the second linear generator set is the same as that of the first linear generator set. Since the size parameter of the high-pressure cylinder is less than that of the low-pressure cylinder, in consideration of a load effect of the piston on the rotor mandrel, the rotor mandrel connected to the high-pressure cylinder is thinner while the rotor mandrel connected to the low-pressure cylinder is thicker. Therefore, the size parameter of the first linear generator set connected to the high-pressure cylinder is also less than that of the second linear generator set connected to the low-pressure cylinder.

Working principle:

The high-pressure cylinders, the low-pressure cylinders, the intercooler, and the cross-over channel form an internal combustion engine set.

The internal combustion engine set drives the rotor mandrel 4 to move, and the generator rotor 3 cuts magnetic induction lines generated by the stator coil 1 to generate power.

Air enters the low-pressure cylinder block 8 from the low-pressure inlet valve 6 and is subjected to first-stage compression under the action of the low-pressure piston 9, and compressed air enters the intercooler 12 for cooling from the outlet valve 10.

The compressed air in the intercooler 12 enters the high-pressure cylinder block 14 through the high-pressure inlet valve 13 and is subjected to second-stage compression under the action of the high-pressure piston 15.

After the compression process is completed, the fuel injector 16 injects fuel, so fuel-air combustion occurs in the high-pressure cylinder block 14; combustion gas pushes the high-pressure piston 15 for first-stage expansion; the expanded combustion gas flows out through the high-pressure exhaust valve 17 to the cross-over channel 18 and flows through the inlet port 11 into the low-pressure cylinder block 8 to push the low-pressure piston 9 for second-stage expansion; and finally, the combustion gas completing the expansion is discharged to an external environment through the low-pressure exhaust valve 7.

The high-pressure cylinder adopts a compression ignition method which enables mixed gases to be self-ignited after fuel injection.

The air is firstly subjected to the first-stage compression by the low-pressure cylinder group in the internal combustion engine set and is then subjected to the second-stage compression in the high-pressure cylinders, so that the intake pressure of an internal combustion engine is effectively increased, which is favorable for increasing the average effective pressure, thereby improving the thermal efficiency and the power generation efficiency of the free piston generator.

The combustion product is firstly subjected to the first-stage expansion in the high-pressure cylinders and is then subjected to the second-stage expansion in the low-pressure cylinders, which effectively increases the energy utilization in the exhaust gas, also increases the expansion work, and further improves the thermal efficiency and the power generation efficiency of the free piston generator.

By means of the rigid synchronous transmission assembly, the high-pressure piston 15 and the low-pressure piston 9 are always kept in stable phase operation, so as to avoid the problems of wall-impingement and insufficient pressure of compressed air due to the phase mismatching.

The rigid synchronous transmission assembly includes a transmission shaft 19 and two worm wheels 22 fixedly arranged at two ends of the transmission shaft 19; several spiral teeth 21 are circumferentially machined at end parts of the two rotor mandrels 4 close to the transmission shaft 19; and the two worm wheels 22 and the spiral teeth 21 on the two rotor mandrels 4 are correspondingly engaged to form two groups of worm wheel and worm pairs. Parameters such as the radius and the number of teeth of the two groups of worm wheel and worm pairs are determined by a relative relationship of specific movement phases of the high-pressure piston 15 and the low-pressure piston 9. The rotor mandrel 4 in the first linear generator set does a reciprocating linear movement and drives, through the worm wheel and worm pair, the transmission shaft 19 to rotate; the transmission shaft 19 then converts its rotation into the reciprocating linear movement of the other rotor mandrel 4 through the other group of worm wheel and worm pair, thereby driving the low-pressure piston 9 to linearly move. Since the two rotor mandrels 4 are rigidly connected through the transmission shaft 19 and the two groups of worm wheel and worm pairs, the relative spatial positions of the high-pressure piston 15 and the low-pressure piston 9 are always controlled by the designed kinematic law, so as to keep stable work of the free piston generator.

The transmission shaft 19 is mounted on a supporting structure through a bearing 20. The supporting structure may be any structure that can realize radial limitation to the transmission shaft 19. The transmission shaft 19 can only move along its circumferential direction through the bearing 20.

In each linear generator set, springs 5 are fixedly arranged between two ends of the generator rotor 3 and the shell 2, respectively. In such a design, the movement of the generator rotor 3 is limited through the springs 5, so as to prevent the generator rotor from colliding with the shell and prevent the piston from hitting the cylinder head.

The number of the high-pressure inlet valves 13 mounted on each high-pressure cylinder block 14 is two. In such a design, the volume efficiency of the high-pressure cylinder block 14 is improved.

The stroke of the low-pressure cylinder is the same as that of the high-pressure cylinder.

The volume and the inner diameter of the high-pressure cylinder block 14 are less than the volume and the inner diameter of the low-pressure cylinder block 8. The generator of the application is in a high-temperature environment; the volume and surface area of the high-pressure cylinder for combustion are relatively small, so that the heat transfer loss can be reduced, and the energy utilization is increased.

Piston rings are mounted on the high-pressure piston 15 and the low-pressure piston 9. In such a design, a lubrication effect in the cylinder is enhanced, and leakage of air and combustion gas is prevented.

The high-pressure cylinder block 14 and the low-pressure cylinder block 8 are provided with cylinder heads, and a temperature sensor and a pressure sensor are arranged on each cylinder head. In such a design, a working condition in the cylinder block is effectively monitored.

What is claimed is:

1. An apparatus comprising:
   a first linear generator, a second linear generator, a rigid synchronous transmission assembly, two first cylinders, and two second cylinders;
   wherein each of the first linear generator and the second linear generator comprises a shell, a rotor mandrel movable through the shell, a stator coil fixed to the shell and coaxially sleeving the rotor mandrel, and a generator rotor;
   wherein the generator rotor has a magnet, is coaxially fixed to the rotor mandrel and is between the stator coil and the rotor mandrel;
   wherein the rotor mandrel of the first linear generator and the rotor mandrel of the second linear generator are connected through the rigid synchronous transmission assembly;
   wherein each of the first cylinders comprises a first cylinder block and a first piston;
   wherein the first cylinder block comprises a fuel injector, a first inlet valve, and a first exhaust valve;
   wherein the first pistons are fixedly connected to two ends of the rotor mandrel of the first linear generator, respectively;
   wherein each of the second cylinders comprises a second cylinder block and a second piston;
   wherein the second cylinder block comprises a second inlet valve, a second exhaust valve, an inlet port, and an outlet valve;
   wherein the second pistons are fixedly connected to two ends of the rotor mandrel of the second linear generator, respectively;
   wherein the apparatus further comprises a first intercooler fluidly connected to the first inlet valve of one of the first cylinders and the outlet valve of one of the second cylinders and a second intercooler fluidly connected to the first inlet valve of the other of the first cylinders and the outlet valve of the other of the second cylinders; and
   wherein the apparatus further comprises a first cross-over channel fluidly connected to the first exhaust valve of one of the first cylinders and the inlet port of one of the second cylinders and a second cross-over channel fluidly connected to the first exhaust valve of the other of the first cylinders and the inlet port of the other of the second cylinders.

2. The apparatus according to claim 1, wherein the rigid synchronous transmission assembly comprises a transmission shaft and two worm wheels fixedly and respectively attached to two ends of the transmission shaft;
   wherein the rotor mandrel of the first linear generator comprises a first worm and the rotor mandrel of the second linear generator comprises a second worm, the first worm and the second worm respective engaging the worm wheels.

3. The apparatus according to claim 2, wherein the transmission shaft is mounted on a supporting structure through a bearing.

4. The apparatus according to claim 1, wherein each of the first linear generator and the second linear generator comprise springs between the generator rotor and the shell.

5. The apparatus according to claim 1, wherein the first cylinders and the second cylinders have the same stroke length.

6. The apparatus according to claim 5, wherein the first cylinder block has a smaller volume and a smaller inner diameter than the second cylinder block.

7. The apparatus according to claim 1, wherein each of the first cylinders and the second cylinders comprises a temperature sensor and a pressure sensor on a cylinder head thereof.

\* \* \* \* \*